United States Patent
Paille et al.

(10) Patent No.: US 12,135,468 B2
(45) Date of Patent: Nov. 5, 2024

(54) METHOD AND APPARATUS FOR EVALUATING EFFICACY OF OPHTHALMIC LENS IN CONTROLLING SIGHTEDNESS IMPAIRMENT

(71) Applicant: ESSILOR INTERNATIONAL, Charenton-le-pont (FR)

(72) Inventors: Damien Paille, Singapore (SG); Björn Drobe, Singapore (SG)

(73) Assignee: Essilor International, Charenton-le-pont (FR)

( * ) Notice: Subject to any disclaimer, the term of this patent is extended or adjusted under 35 U.S.C. 154(b) by 655 days.

(21) Appl. No.: 17/312,148

(22) PCT Filed: Dec. 11, 2019

(86) PCT No.: PCT/EP2019/084692
§ 371 (c)(1),
(2) Date: Jun. 9, 2021

(87) PCT Pub. No.: WO2020/120595
PCT Pub. Date: Jun. 18, 2020

(65) Prior Publication Data
US 2022/0043280 A1    Feb. 10, 2022

(30) Foreign Application Priority Data
Dec. 12, 2018    (EP) ...................................... 18306673

(51) Int. Cl.
*G02C 7/02*    (2006.01)
*G02C 7/06*    (2006.01)

(52) U.S. Cl.
CPC ............. *G02C 7/027* (2013.01); *G02C 7/061* (2013.01); *G02C 2202/24* (2013.01)

(58) Field of Classification Search
CPC .... G02C 7/027; G02C 7/061; G02C 2202/24; G02C 7/02; G02C 7/00; A61B 3/0025; A61B 3/028; A61B 3/1005; A61B 3/103
See application file for complete search history.

(56) References Cited

U.S. PATENT DOCUMENTS 6,199,983 B1    3/2001 Kato et al.
2009/0122264 A1*  5/2009 Ho ........................ C08L 19/006
                                                    351/159.73

(Continued)

FOREIGN PATENT DOCUMENTS

CN    101842684 A    9/2010
EP    0880046 A1    11/1998
(Continued)

OTHER PUBLICATIONS

Office Action issued in Japanese Patent Application No. 2021-529456 dated Jun. 12, 2023.
Woods et al., "A Relationship between Tolerance of Blur and Personality", Investigative Ophthalmology & Visual Science, Nov. 2010, vol. 51, No. 11, pp. 6077-6082.

(Continued)

*Primary Examiner* — Darryl J Collins
*Assistant Examiner* — Matthew Y Lee
(74) *Attorney, Agent, or Firm* — NIXON & VANDERHYE (57) ABSTRACT

A method to select or to conceive/design lenses is provided. The method may be applied to lenses having effect of myopia control, visual fatigue relief, etc. In one aspect, a predictive model that ranks myopia control solutions according to visual, behavioral, and biometric parameter is provided. The predictive model may be built based on the myopic eye characteristics, the behavior of the wearers, and the defocus induced by the myopia control solution. In another aspect, a method, a computer-readable medium, and (Continued)

an apparatus for evaluating the efficacy of an ophthalmic lens in controlling at least one sightedness impairment (e.g., myopia) of at least one wearer of the ophthalmic lens are provided. The apparatus may determine, based on a predetermined relationship model, the efficacy of the ophthalmic lens for at least one wearer from representative data corresponding to the at least one wearer.

20 Claims, 9 Drawing Sheets

(56) References Cited

U.S. PATENT DOCUMENTS

| | | | |
|---|---|---|---|
| 2010/0296058 A1 | 11/2010 | Ho et al. | |
| 2012/0033179 A1 | 2/2012 | Kratzer et al. | |
| 2012/0113388 A1* | 5/2012 | Back | G02C 7/04 351/159.79 |
| 2014/0111763 A1* | 4/2014 | Griffin | G02C 7/061 351/159.79 |
| 2015/0230744 A1* | 8/2015 | Faubert | A61B 3/103 600/323 |
| 2016/0000314 A1* | 1/2016 | Drobe | A61B 3/028 351/246 |
| 2018/0275425 A1* | 9/2018 | Collins | G02C 7/027 |

FOREIGN PATENT DOCUMENTS

| | | |
|---|---|---|
| JP | 2006126877 A | 5/2006 |
| JP | 2011501240 A | 1/2011 |
| JP | 2012518501 A | 8/2012 |
| JP | 2012526303 A | 10/2012 |
| JP | 2016509878 A | 4/2016 |
| WO | 2009055638 A1 | 4/2009 |

OTHER PUBLICATIONS

Office Action issued in Chinese Patent Application No. 201980075600.5 dated Sep. 16, 2022.

Rose et al., "Outdoor Activity Reduces the Prevalence of Myopia in Children", Ophthalmology, vol. 115, No. 8, Feb. 21, 2008, pp. 1279-1285.

Kowalski et al., "Adaptability of Myopic Children to Progressive Addition Lenses with a Modified Fitting Protocol in the Correction of Myopia Evaluation Trial (COMET)", Optometry And Vision Science, vol. 82, No. 4, Apr. 4, 2005, pp. 328-337.

Smith et al., "Optical treatment strategies to slow myopia progression: Effects of the visual extent of the optical treatment zone", Experimental Eye Research, vol. 114, Jan. 3, 2013, pp. 77-88.

Scheiman et al., "Longitudinal changes in corneal curvature and its relationship to axial length in the Correction of Myopia Evaluation Trial (COMET) cohort", Journal of Optometry, vol. 9, No. 1, Nov. 11, 2015, pp. 13-21.

Harb et al., "Choroidal Thickness Profiles in Myopic Eyes of Young Adults in the Correction of Myopia Evaluation Trial Cohort", American Journal of Ophthalmology, vol. 160, No. 1, Apr. 18, 2015, pp. 62.e2-71.e2.

International Search Report for PCT/EP2019/084692, mailed Feb. 6, 2020, 12 pages.

Kowalski et al., "Adaptability of Myopic Children to Progressive Addition Lenses with a Modified Fitting Protocol in the Correction of Myopia Evaluation Trial (COMET)", Optometry and Vision Science, vol. 82, No. 4, Apr. 4, 2005.

Harb et al., "Choroidal Thickness Profiles in Myopic Eyes of Young Adults in the Correction of Myopia Evaluation Trial Cohort", American Journal of Ophthalmology, vol. 160, No. 1, Apr. 18, 2015, pp. 62.

\* cited by examiner

METHOD AND APPARATUS FOR EVALUATING EFFICACY OF OPHTHALMIC LENS IN CONTROLLING SIGHTEDNESS IMPAIRMENT

This application is the U.S. national phase of International Application No. PCT/EP2019/084692 filed 11 Dec. 2019, which designated the U.S. and claims priority to EP Patent Application No. 18306673.7 filed 12 Dec. 2018, the entire contents of each of which are hereby incorporated by reference.

TECHNICAL FIELD

Various aspects of this disclosure generally relate to evaluating efficacy of an ophthalmic lens in controlling sightedness impairment of a wearer, and more particularly, to methods and apparatus for determining lenses for myopia control or visual fatigue relief.

BACKGROUND

It has been observed that some individuals, in particular children, focus inaccurately when they observe an object that is situated at a short distance away, that is to say, in near vision conditions. Because of this focusing defect on the part of a myopic child that is corrected for his far vision, the image of an object close by is also formed behind his retina, even in the foveal area.

Many type of products for slowing down myopia progression can be used, such as ophthalmic lenses, contact lenses or drugs. For example, to avoid a myopia progression that is due to such focusing defect, it is known to use a myopia-correcting lens that is of the progressive multifocal ophthalmic lens type. Bifocal lenses may also be an example of ophthalmic lenses that can be used to slow down myopia progression.

Each individual may react differently to the different myopia control products. However, since myopia progression is a long-term process it is difficult for an eye care professional to estimate the efficiency of a given myopia control product for a wearer. Clinical trials and prototyping are time and money consuming. A model that could provide an estimation of the efficacy of a new solution to slow myopia progression may be desirable, so that significant time and money may be saved either by reducing the number of lenses to test, or by pre-selecting the most promising candidates, or by helping to design the myopia control solution.

Moreover, in a clinical practice, it is hard to guess if one product is the better one for a kid. A model that ranks myopia solutions with high accuracy may be of tremendous help for the clinician to select the best product.

SUMMARY

The following presents a simplified summary in order to provide a basic understanding of various aspects of the disclosed invention. This summary is not an extensive overview of all contemplated aspects, and is intended to neither identify key or critical elements of all aspects nor delineate the scope of any or all aspects. The sole purpose is to present some concepts of one or more aspects in a simplified form as a prelude to the more detailed description that is presented later.

This disclosure describes a method to select or to conceive/design lenses. In some embodiments, the method may be applied to lenses for e.g., myopia control, visual fatigue, etc. In some embodiments, a predictive model that ranks myopia control solutions according to visual, behavioural, and biometric parameter is provided. In some embodiments, the predictive model may be built based on the myopic eye characteristics, the behavior of the wearers, and the defocus induced by the myopia control solution.

In one aspect of the disclosure, a method, a computer-readable medium, and an apparatus for evaluating the efficacy of an ophthalmic lens in controlling at least one sightedness impairment (e.g., myopia) of at least one wearer of said ophthalmic lens are provided. The apparatus may obtain data representative of optical characteristics of the ophthalmic lens, characteristics of said at least one wearer, and behavior of said at least one wearer. The apparatus may determine, by at least one processor based on a predetermined relationship model, the efficacy of the ophthalmic lens for said at least one wearer from said representative data corresponding to said at least one wearer.

In another aspect of the disclosure, a method, a computer-readable medium, and an apparatus for constructing a relationship model configured for providing the efficacy of at least one ophthalmic lens in controlling at least one sightedness impairment (e.g., myopia) of wearers of said at least one ophthalmic lens are provided. The apparatus may obtaining data representative of optical characteristics of said at least one ophthalmic lens, characteristics of monitored wearers, and behavior of the monitored wearers. The apparatus may obtain monitored efficacies corresponding to said representative data. The apparatus may construct, by at least one processor, the relationship model by correlating said representative data corresponding to said monitored wearers with the monitored efficacies. In another aspect of the disclosure, a method, computer-readable medium and apparatus are provided for constructing the relationship model that is advantageously configured for executing the method for evaluating the efficacy of an ophthalmic lens in any of its execution modes.

To the accomplishment of the foregoing and related ends, the aspects disclosed include the features hereinafter fully described and particularly pointed out in the claims. The following description and the annexed drawings set forth in detail illustrate certain features of the aspects of the disclosure. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various possible configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of determining lenses for myopia control or visual fatigue relief will now be presented with reference to various apparatus and methods. The apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors, or one or more computing devices. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

The disclosure describes a method for lens selection, or conception, or evaluation using user data (e.g., medical prescriptions, lifestyle, time of wearing lenses, etc.) and specific ocular characteristics (e.g., peripheral refraction or eye shape). In some embodiments, the user data may be collected from an "average" user defined based on population data or from a given individual.

In some embodiments, a predictive model may be built based on the following steps: a) Creating a criterion based on lens, eye, lifestyle parameters (the criterion may be referred to as an optical index, more particularly, defocus index (DI)); b) Calculating the criterion for one user and for existing lenses which have been tested for a given effect; c) Obtaining a performance factor from the testing of the lens (for example myopia control); d) Correlating or linking through a mathematical function the criterion and the performance factor for each lens.

In some embodiment, the step d) Correlating or linking through a mathematical function the criterion and the performance factor for each lens) implies the use of the pre-determined relationship model.

In some embodiments, the predictive model may be used for lens conception. For example, for a lens whose performance is not known, the criterion may be calculated and obtained through the predictive model, a predictive performance factor for a standard user or a group of standard users.

In some embodiments, the predictive model may be used for lens selection. For example, for a given user, the criteria may be re-calculated for each lens based on the individual user data. A new predictive model may be determined and the most efficient lens for the user may be selected based on the new predictive model for this user.

In some embodiments, the predictive model may be used for lens evaluation. For example, for either a standard user, a specific user, or a group of users (standard or specific), the criteria may be re-calculated for a specific lens. The predicted effect of the specific lens may be determined and compared to other lenses (either for each user or as an average effect).

In some embodiments, the predictive model may be updated based on new clinical trials testing new lenses (characteristics of lens and efficacy) or database of lens characteristics/efficacy. In some embodiments, a group of standard users may have different refractions and other ocular characteristics. A standard user may have ocular characteristics that are representative of a specific group of wearers.

In some embodiments, a predictive model that predicts myopia control efficacy based on a defocus index is provided. The defocus index (criterion) may be calculated based on visual characteristics (e.g., refraction, accommodative lag), ocular or biometric characteristics (e.g., peripheral refraction for each location of the retina), subject's lifestyle or behavior (e.g., time spent in near and far vision, usual near distance), and different lenses. The efficacy for an ophthalmic lens in controlling a sightedness impairment of one or more wearers of the ophthalmic lens is the ability of the ophthalmic lens to produce a desired or intended result in controlling the sightedness impairment of the one or more wearers. In some embodiment, the efficacy may be defined as a percentage value, e.g., 100% being the highest efficacy and 0% being the lowest efficacy.

For each lens, a defocus index may be calculated. The defocus index is defined as the weighted sum of defocus values at different locations of the retina, corresponding to locations on the lens (e.g., locations for far and near vision).

Figure 1:
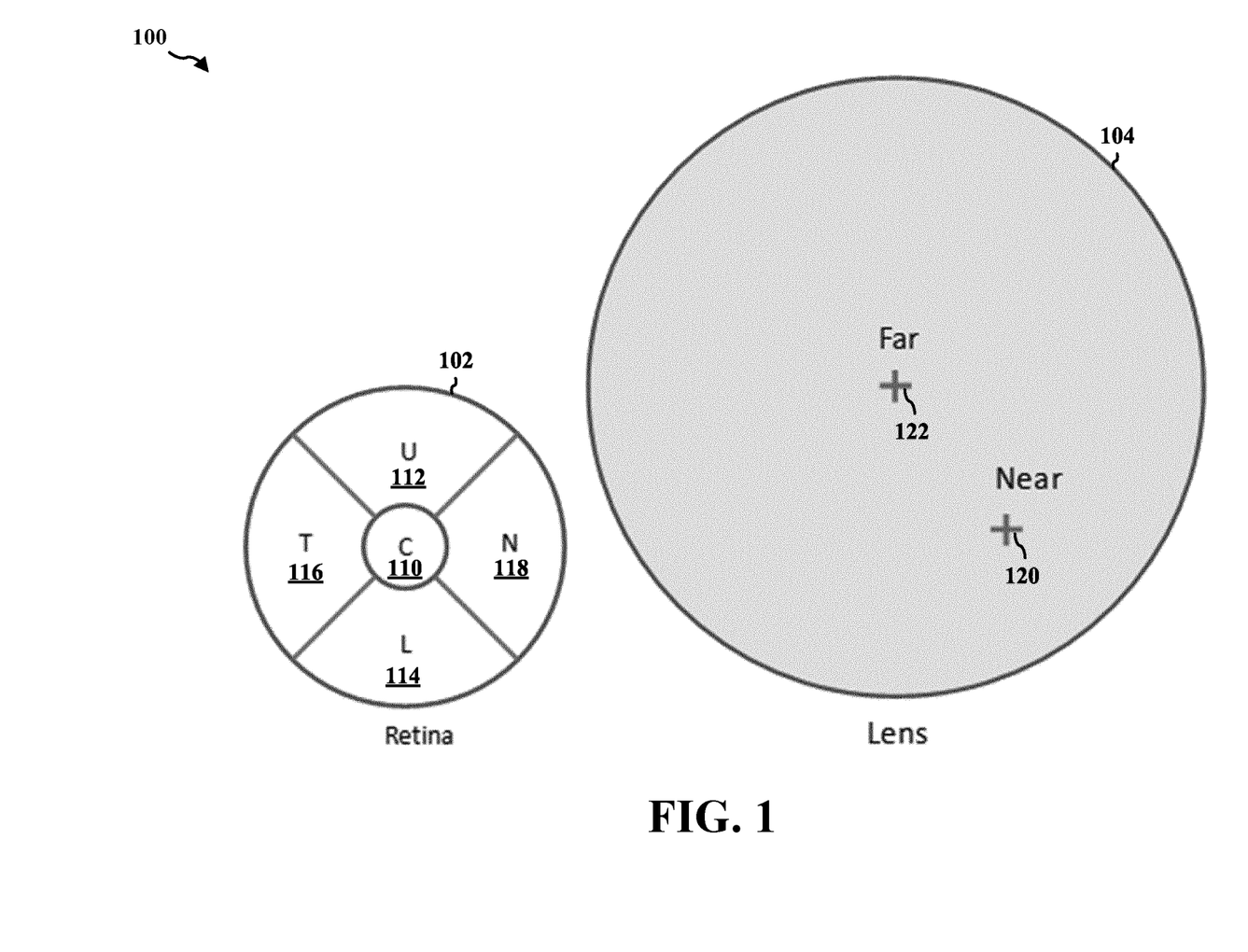
FIG. 1 is a diagram illustrating an example of a myopia control predictive model.

FIG. 1 is a diagram 100 illustrating an example of a myopia control predictive model. In the example, a retina 102 and a lens 104 are shown. The retina 102 includes five locations: central 110, upper 112, lower 114, temporal 116, and nasal 118. There are two fixations or locations (near vision point 120 and far vision point 122) on the lens 104.

When looking through each of the two locations (near vision point 120 and far vision point 122) of the lens 104, the retinal locations are associated with zones on the lens, i.e. the power in the locations 120 and 122 on the lens 104 produces a given value of defocus on the retina 102, linked to the power of the lens in this retina location, the peripheral refraction in this part of the retina and the lag of accommodation (usually considered as zero in far vision, but does not have to be).

Figure 2:
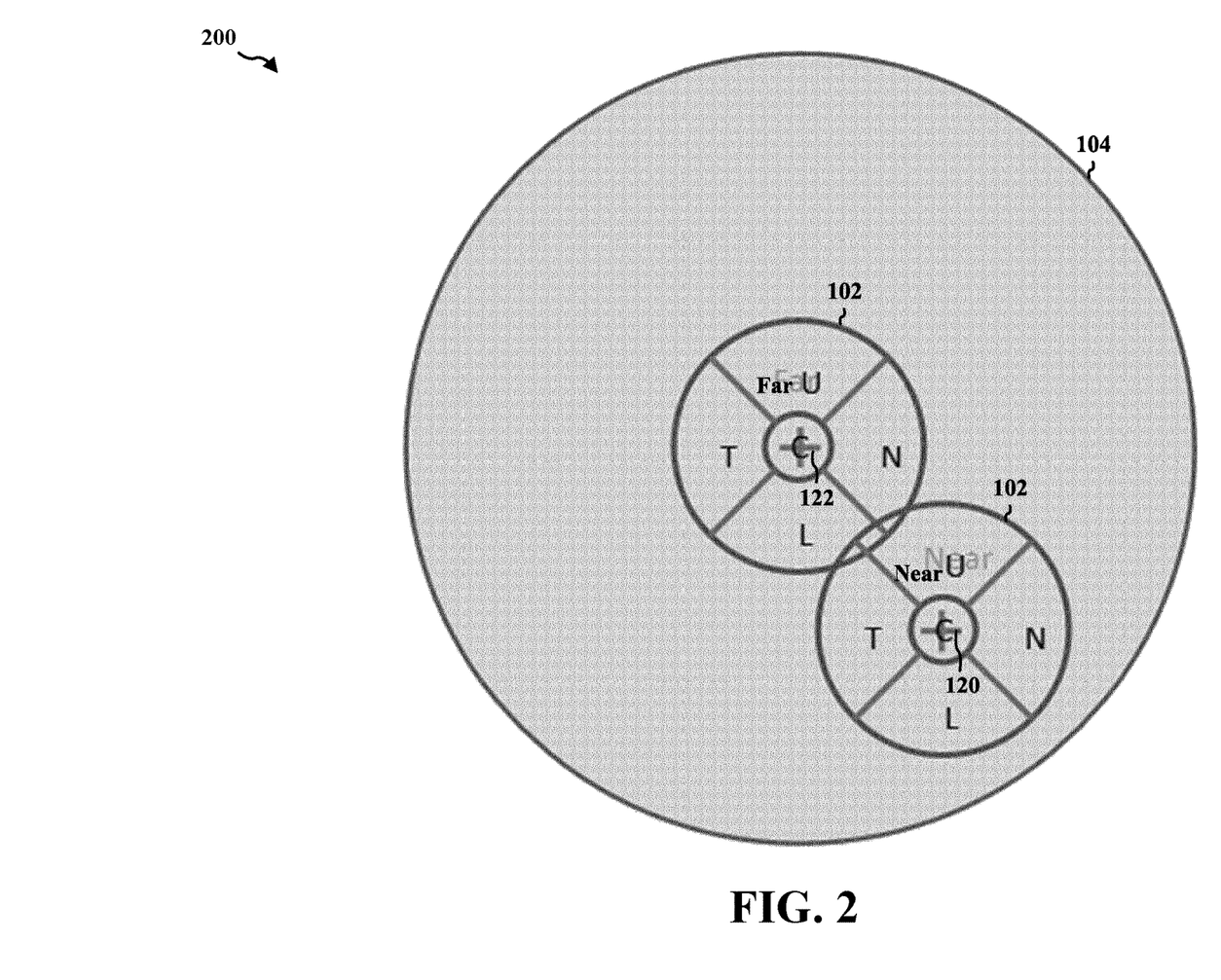
FIG. 2 is a diagram illustrating the pattern of defocus on the retina corresponding to locations on the lens.

FIG. 2 is a diagram 200 illustrating the pattern of defocus on the retina 102 corresponding to locations 120 and 122 on the lens 104. As shown, each location on the retina 102 has a defocus value corresponding to the location 120 on the lens 104, as well as a defocus value corresponding to the location 122 on the lens 104.

Therefore, the formula for calculating the defocus index with regard to the retina 102 and the lens 104 may be:

$$DI = \% \ FV * ((wCR * (CRx + CD_{Far} + Lag_{Far}) + \\ wUR * (URx + UD_{Far} + Lag_{Far}) + wLR * \\ (LRx + LD_{Far} + Lag_{Far}) + wTR * (TRx + TD_{Far} + Lag_{Far}) + \\ wNR * (NRx + ND_{Far} + Lag_{Far})) + \\ \% \ NV * ((wCR * (CRx + CD_{Near} + Lag_{Near}) + \\ wUR * (URx + UD_{Near} + Lag_{Near}) + \\ wLR * (LRx + LD_{Near} + Lag_{Near}) + \\ wTR * (TRx + TD_{Near} + Lag_{Near}) + \\ wNR * (NRx + ND_{Near} + Lag_{Near})), \quad (1)$$

With
Wear's behaviour (lifestyle related) parameters:
% FV: percentage of time spent in far vision
% NV: percentage of time spent in near vision=1−% FV
Weights for local parts of the retina (some parts of the retina contribute more to emmetropization than others):
wCR: weight for central retina
wUR: weight for upper retina
wLR: weight for lower retina
wTR: weight for temporal retina
wNR: weight for nasal retina
(Peripheral) relative refraction for each location of the retina:
CRx: central refraction/correction
NRx: average relative peripheral refraction in nasal retina
TRx: average relative peripheral refraction in temporal retina
URx: average relative peripheral refraction in upper retina
LRx: average relative peripheral refraction in lower retina Defocus induced by the lens in each location of the retina:

$CD_{Far}$: defocus induced by the lens in the central retina while looking through the far point of the lens $ND_{Far}$: defocus induced by the lens in the nasal retina while looking through the far point of the lens $TD_{Far}$: defocus induced by the lens in the temporal retina while looking through the far point of the lens $UD_{Far}$: defocus induced by the lens in the upper retina while looking through the far point of the lens $LD_{Far}$: defocus induced by the lens in the lower retina while looking through the far point of the lens $CD_{Near}$: defocus induced by the lens in the central retina while looking through the near point of the lens $ND_{Near}$: defocus induced by the lens in the nasal retina while looking through the near point of the lens $TD_{Near}$: defocus induced by the lens in the temporal retina while looking through the near point of the lens $UD_{Near}$: defocus induced by the lens in the upper retina while looking through the near point of the lens $LD_{Near}$: defocus induced by the lens in the lower retina while looking through the near point of the lens Accommodative error induced by the lens at the given near distance:

$Lag_{Far}$: Lag of accommodation induced by the lens at far distance (looking at a distant object). By convention, signed negative for a lag. For a lead of accommodation, the sign would be positive. Usually the lag at far is null.

$Lag_{Near}$: Lag of accommodation induced by the lens at near distance (looking at a close object at a given distance). By convention, signed negative for a lag. For a lead of accommodation, the sign would be positive. For different near distances, there will be different lag values.

The defocus induced by the lens is proportional to the amount of light for a given power of the lens. That is, if a lens has for example two powers passing through the pupil with a 50/50% ratio, the defocus is 50% of one power+50% of the other power.

This example can be extended to every single point of the lens and the retina with hundreds of points of the lens and peripheral refractions.

Figure 3:
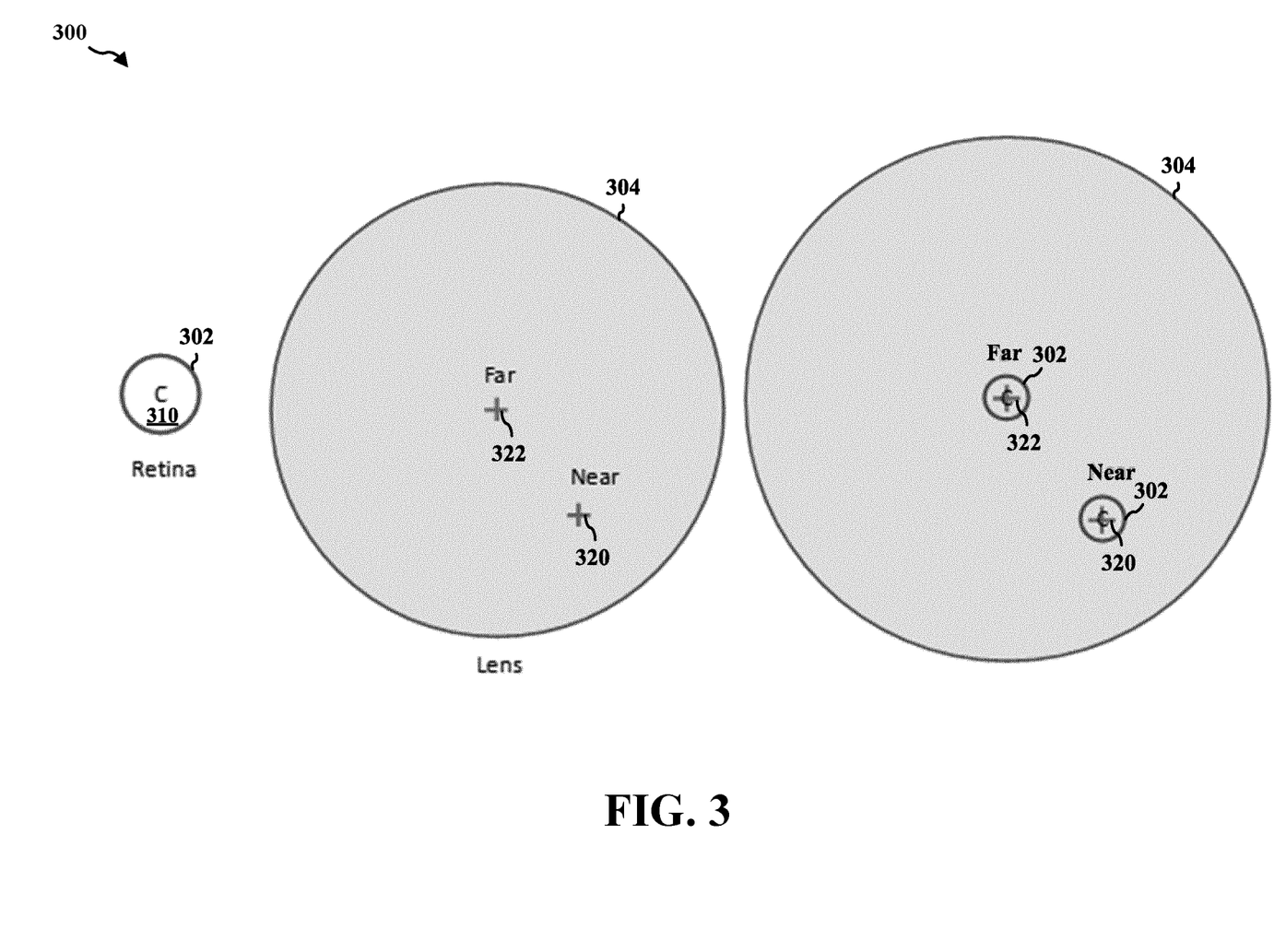
FIG. 3 is a diagram illustrating a simplified example of the predictive model described above in FIGS. 1 and 2.

FIG. 3 is a diagram 300 illustrating a simplified example of the predictive model described above in FIGS. 1 and 2. In the example, a retina 302 and a lens 304 are shown. The retina 302 includes only one location, i.e., central 310. There are two fixations or locations (near vision point 320 and far vision point 322) on the lens 304. Thus, in the simplified example, there are only two locations 320 and 322 on the lens 304, lag of accommodation at near vision point 320 (lag of accommodation at far vision point 322 is considered as zero), no peripheral refraction in the simplified example. This model could be well adapted for bifocals of progressive lenses for example. There is no need to measure peripheral refraction, which can be complicated and expensive. A pattern of defocus on the retina 302 corresponding to locations 320 and 322 on the lens 304 is shown in FIG. 3.

Therefore, the formula for calculating the defocus index with regard to the retina 302 and the lens 304 may be:

$$DI=\% \ FV*(CRx+CD_{Far})+\% \ NV*(CRx+CD_{Near}+Lag_{Near}) \quad (2)$$

With

Lifestyle related parameters:

% FV: percentage of time spent in far vision

% NV: percentage of time spent in near vision=1−% FV

Defocus induced by the lens in each location of the retina:

$CD_{Far}$: defocus induced by the lens in the central retina while looking through the far point of the lens $CD_{Near}$: defocus induced by the lens in the central retina while looking through the near point of the lens (Peripheral) relative refraction for each location of the retina:

CRx: central refraction/correction

Accommodative error induced by the lens at the given near distance:

$Lag_{Near}$: Lag of accommodation induced by the lens at near distance (looking at a close object at a given distance). By convention, signed negative for a lag. For a lead of accommodation, the sign would be positive. For different near distances, there will be different lag values.

Figure 4:
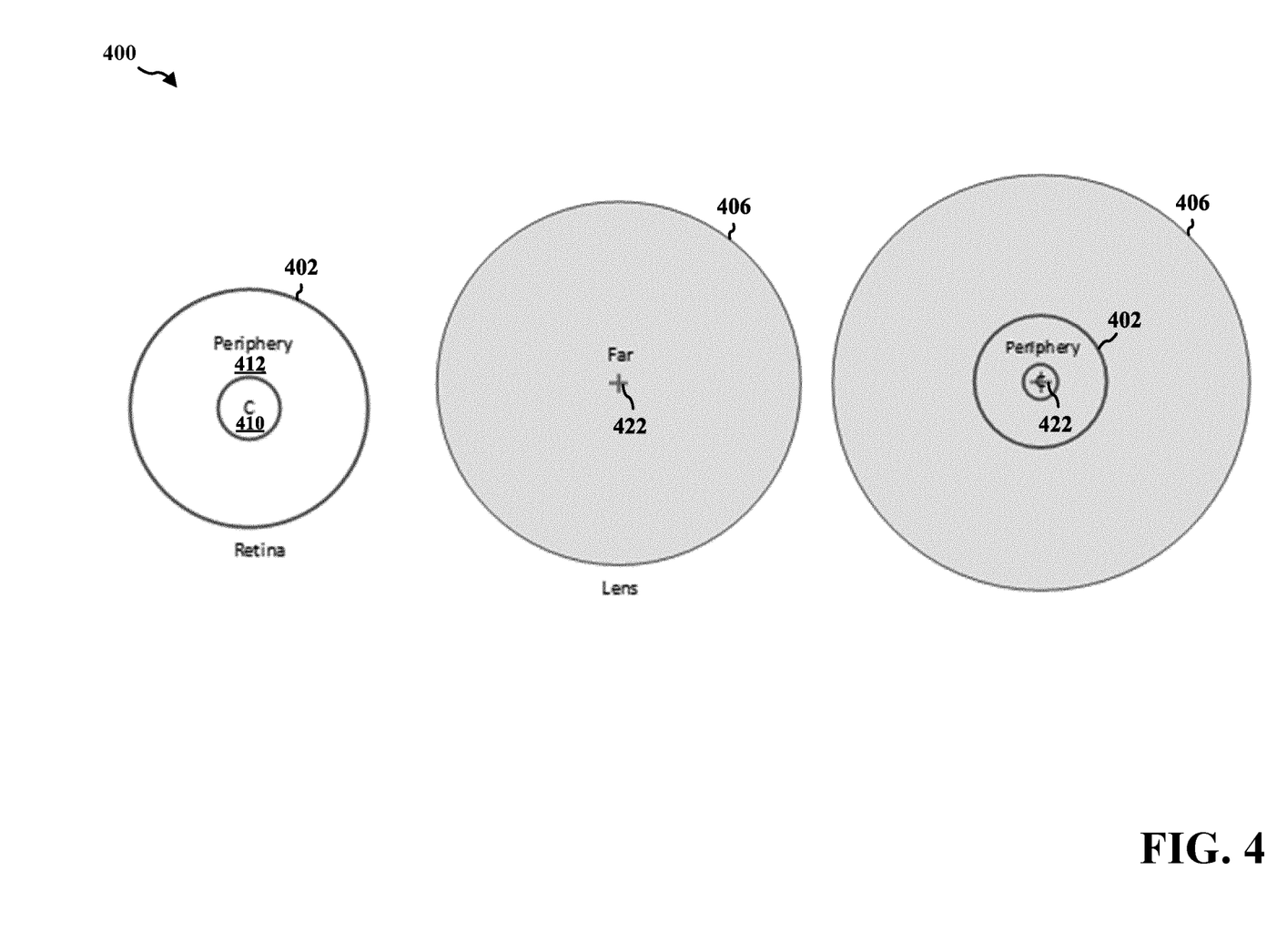
FIG. 4 is a diagram illustrating another simplified example of the predictive model described above in FIGS. 1 and 2.

FIG. 4 is a diagram 400 illustrating another simplified example of the predictive model described above in FIGS. 1 and 2. In the example, a retina 402 and a lens 406 are shown. The retina 402 includes two locations, i.e., central 410 and periphery 412. There are only one fixation or location (far vision point 422) on the lens 406. Thus, in the simplified example, only a far vision point 422 with two locations (central 410 and peripheral 412) on the retina 402 are considered. The entire peripheral retina is considered to have the same peripheral refraction value. This could be adapted for concentric peripheral correction lenses. A pattern of defocus on the retina 402 corresponding to location 422 on the lens 406 is shown in FIG. 4.

Therefore, the formula for calculating the defocus index with regard to the retina 402 and the lens 406 may be:

$$DI = (CRx + CD_{Far}) + wUR*(PRx + PD_{Far}) \quad (3)$$

With (Peripheral) relative refraction for each location of the retina:

CRx: central refraction/correction

PRx: average relative peripheral refraction in peripheral retina

Defocus induced by the lens in each location of the retina:

$CD_{Far}$: defocus induced by the lens in the central retina while looking through the far point of the lens $PD_{Far}$: defocus induced by the lens in the peripheral retina while looking through the far point of the lens.

In the example, the lens is considered to have the same power in the part corresponding to the projection of the peripheral retina, or an average power over this zone is considered.

Myopia control data have been obtained in many clinical trials for many different lenses. The table below shows as an example the average myopia control values for different lenses, as well as the DI for each lens, calculated for a wearer:

| Lens | Single vision lens (SVL) | Spectacle lens 1 for Esophores | Spectacle lens 1 for Exophores | Spectacle lens 2 | Spectacle lens 3 | Spectacle lens 4 | Contact lens 1 | Contact lens 2 |
|---|---|---|---|---|---|---|---|---|
| Myopia Control | 0% | 25% | 10% | 50% | 15% | 60% | 59% | 45% |
| Defocus Index | −2.7 | −2.16667 | −2.33389 | −1.71667 | −2.28153 | 0.2645 | −0.32 | −0.95 |

The table above is obtained with the following wearer characteristics:

% FV=30%

% NV=70%

Lag at 30 cm=1D (diopter)

| | Peripheral relative refraction | Weight |
|---|---|---|
| Central retina | 0 | 1 |
| Upper retina | −0.8 | 0.3 |
| Lower retina | −0.8 | 0.2 |
| Temporal retina | −0.8 | 0.3 |
| Nasal retina | −0.8 | 0.2 |

Figure 5:
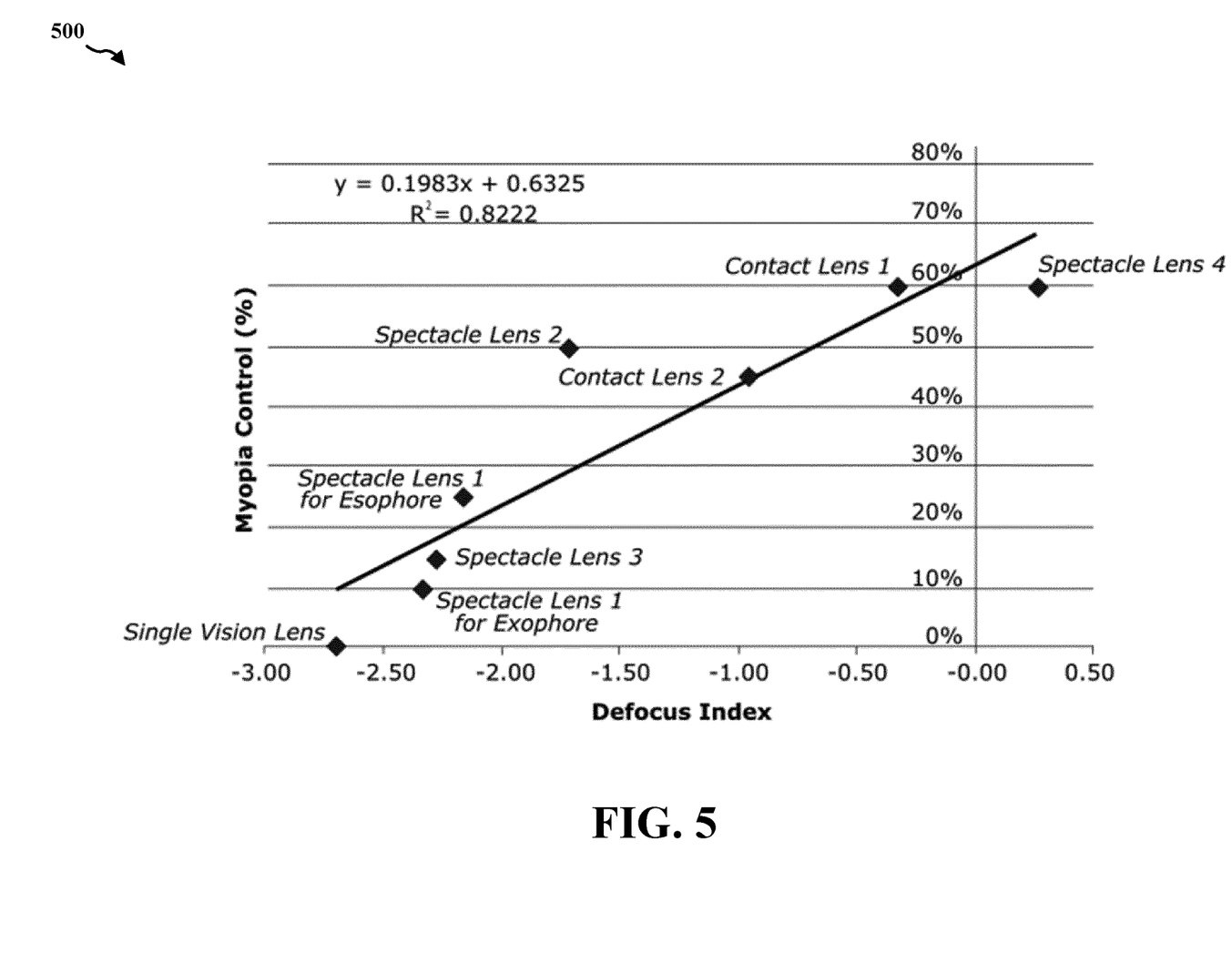
FIG. 5 is a chart showing the link between defocus index and myopia control data for a given subject.

FIG. 5 is a chart 500 showing the link between defocus index and myopia control data for a given subject. As shown, for this particular subject or an average subject, $$\text{Myopia control (\%)} = 0.1983*DI + 0.6325. \quad (4)$$

In some embodiments, the predictive models described above with reference to FIGS. 1-5 may be used for new lens evaluation. For example, for a new spectacle lens for myopia control, with the same wearer data as above, it can be calculated that,

DI=−2.06,

Estimated myopia control efficacy=0.1983*−2.06+0.6325=22%.

Thanks to the predictive model, the average myopia control efficacy may be estimated to be 22%. This estimation may help to decide if the new lens is promising enough to launch a clinical trial or if further work needs to be done on the concept.

In some embodiments, the predictive models described above with reference to FIGS. 1-5 may be used to choose lens for different children. For example, two parents with young children may come to see an optometrist. The first child is 6 years old; his refraction is −2.00 D (diopter) on both eyes; his near vision lag is 1 D; his near phoria is −4 Pr. D (Prismatic Diopter) Exophoria; his time spent at near work is 10% (loves playing soccer). The second child is 7 years old; her refraction is −4.00 D on both eyes; her near vision lag is 2 D; her near phoria is −4 Pr. D Exophoria; her time spent at near work is 90% (loves reading, gets easily sunburns).

Both children are quite young, with limited hygiene. Therefore, the optometrist may decide that contact lenses are not an option. He may consider which spectacle lens would be the most adapted to each child: single vision lenses or progressive addition lenses (PALs).

Based on the predictive models described above in FIGS. 1-5, DI may be calculated for each child regarding different lenses. For example, for the first child, DI for single vision lens may be −1.10; DI for PAL may be −0.70. For the second child, DI for single vision lens may be −3.73; DI for PAL may be −4.12.

Therefore, for the first child, the optometrist may decide to prescribe a PAL lens (lower DI, therefore better myopia control); and for the second child, the optometrist may recommend to rather use a single vision lens, as the DI suggests that the PAL will increase myopia progression compared to a single vision lens.

Figure 6:
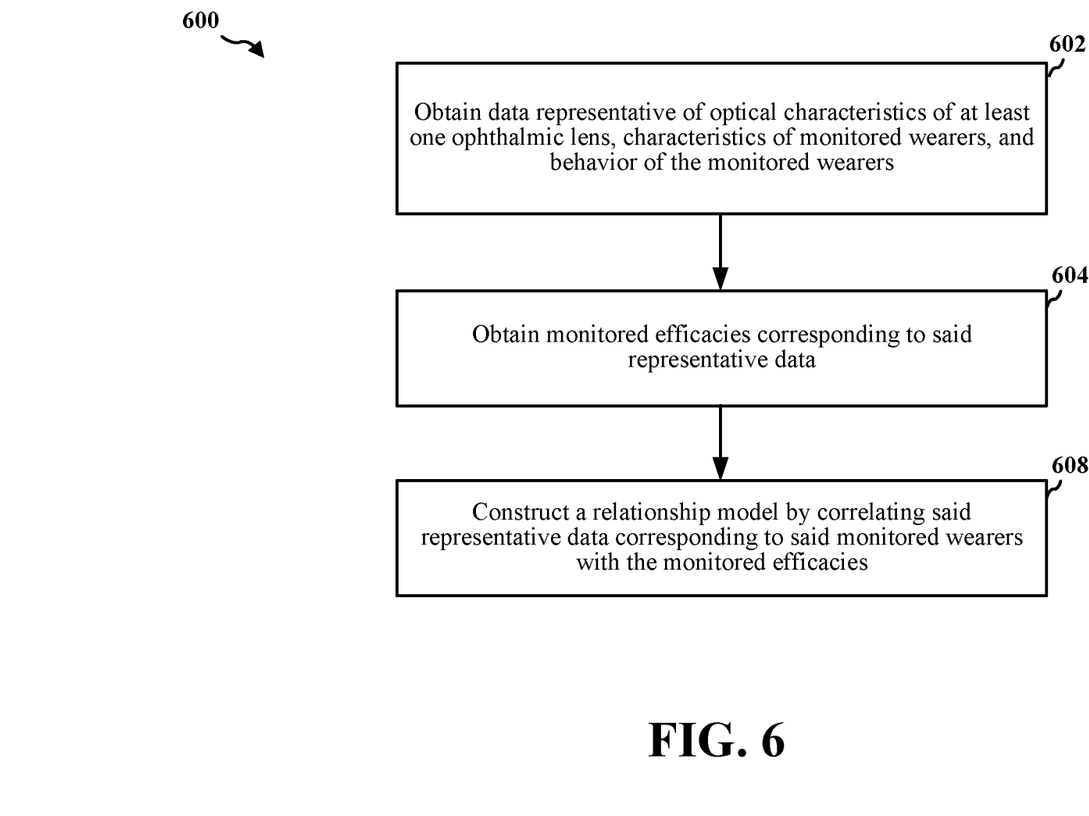
FIG. 6 is a flowchart of a method of constructing a relationship model configured for providing the efficacy of at least one ophthalmic lens in controlling at least one sightedness impairment of wearers of said at least one ophthalmic lens.

FIG. 6 is a flowchart 600 of a method of constructing a relationship model configured for providing the efficacy of at least one ophthalmic lens in controlling at least one sightedness impairment (e.g., myopia) of wearers of said at least one ophthalmic lens. In some embodiments, the method may be performed by an apparatus (e.g., the apparatus 802/802' shown in FIG. 8 or FIG. 9).

At 602, the apparatus may obtain data representative of optical characteristics of said at least one ophthalmic lens, characteristics of monitored wearers, and behavior of the monitored wearers. In some embodiments, the behavior of the monitored wearers may include proportions of time spent in near and far vision. In some embodiments, the optical characteristics of the at least one ophthalmic lens may include optical power of the at least one ophthalmic lens in at least one location of the at least one ophthalmic lens. In some embodiments, the at least one location of the at least one ophthalmic lens may include at least one of a near vision point or a far vision point of the at least one ophthalmic lens. In some embodiments, the characteristics of the monitored wearers may include at least one of central refraction, one or more peripheral refractions, or accommodative lag. In some embodiments, the one or more peripheral refractions may be related to eye shape; and the accommodative lag may be related to a psychologic profile of the monitored wearers. In some embodiments, at least part of the characteristics of the monitored wearers may be induced by the at least one ophthalmic lens.

A lag of accommodation is an under-accommodation which results in blur. A person not sensitive to blur has a higher lag of accommodation. The sensitiveness to blur is related to the personality of the person, also considered as part of the psychologic profile.

*A Relationship between Tolearance of blur and Personality*, IOVS, November 20110, Vol 51, No 11 by Woods et al teaches that factors suggest that people who lack self confidence require strong evidence of blur before they become annoyed by the blur of an image or that caused by a visual device. Furthermore, disorganized people may tolerate blur because it is simply another manifestation of their untidy personal environments. These two factors predicted blur tolerance better than the hypothesized overall psychological adjustment to sensory inputs.

At 604, the apparatus may obtain monitored efficacies corresponding to said representative data. In some embodiments, the representative data and the monitored efficacies may be derived from clinical data regarding the at least one ophthalmic lens. In some embodiments, the characteristics of the monitored wearers and the behavior of the monitored wearers may be updated continuously based on clinical trials.

At 608, the apparatus may construct, by at least one processor, the relationship model by correlating said representative data corresponding to said monitored wearers with the monitored efficacies. In some embodiments, to construct the relationship model, the apparatus may calculate an optical index for each ophthalmic lens of the at the least one ophthalmic lens based on said optical characteristics of the ophthalmic lens, said characteristics of said monitored wearers, and said behavior of said monitored wearers, and correlate the optical indexes with the monitored efficacies. In some embodiments, the relationship model may represent a linear or non-linear function between the efficacy and the optical index.

In some embodiments, the optical index may be calculated as a weighted function of values on at least one location of retina of the monitored wearers. In some embodiments, the optical index may be calculated based on one or more of: a percentage of time spent in far vision, a percentage of time spent in near vision, weights for the at least one location of the retina of the monitored wearers, refractions for the at least one location of retina of the monitored wearers, optical powers of the ophthalmic lens corresponding to the at least one location of retina, or accommodative lag induced by the ophthalmic lens at a given distance. In such embodiments, the optical index may be the defocus index described above with reference to FIGS. 1-5. In some embodiments, the optical index may be calculated using Formula (1). In some embodiments, the optical index may be calculated using a modified or simplified version of Formula (1), e.g., Formula (2) or (3). In some embodiments, the optical powers of the ophthalmic lens corresponding to the at least one location of retina may be the defocus induced by the lens in the at least one location of retina, e.g., one or more of $CD_{Far}$, $ND_{Far}$, $TD_{Far}$, $UD_{Far}$, $LD_{Far}$, $CD_{Near}$, $ND_{Near}$, $TD_{Near}$, $UD_{Near}$, $LD_{Near}$, $CD_{Far}$, $CD_{Near}$, or $PD_{Far}$.

Figure 7:
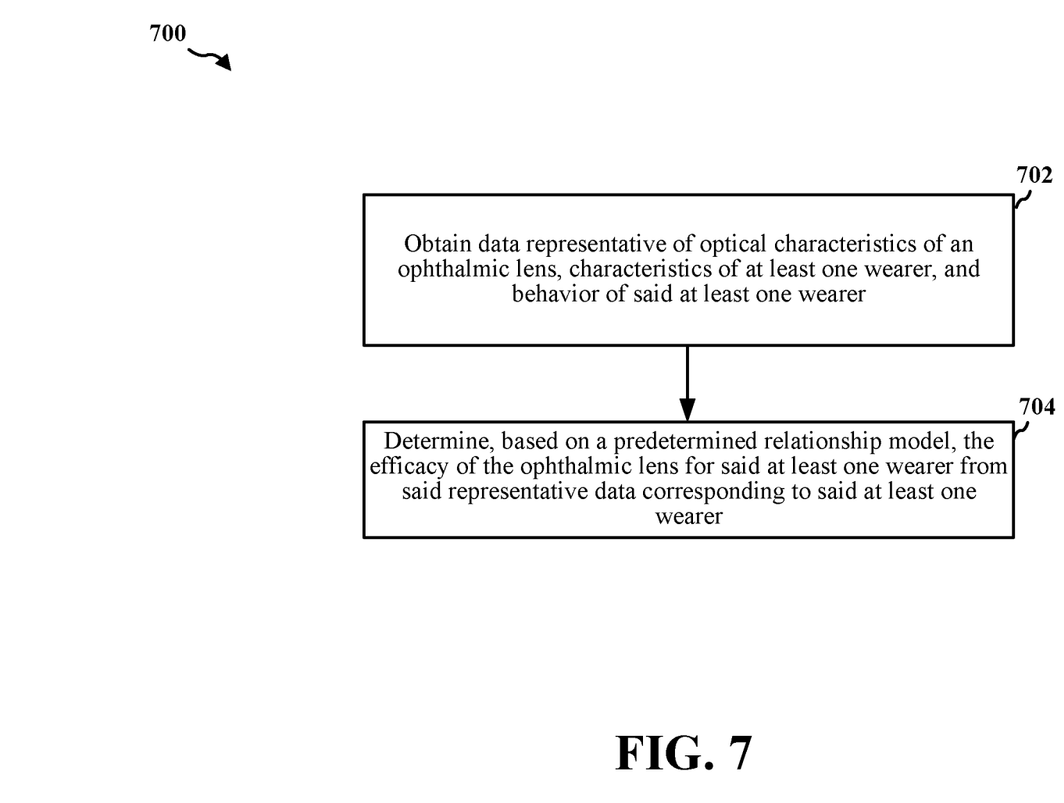
FIG. 7 is a flowchart of a method of evaluating the efficacy of an ophthalmic lens in controlling at least one sightedness impairment of at least one wearer of said ophthalmic lens.

FIG. 7 is a flowchart 700 of a method of evaluating the efficacy of an ophthalmic lens in controlling at least one sightedness impairment (e.g., myopia) of at least one wearer of said ophthalmic lens. In some embodiments, the method may be performed by an apparatus (e.g., the apparatus 802/802' shown in FIG. 8 or FIG. 9).

At 702, the apparatus may obtain data representative of optical characteristics of the ophthalmic lens, characteristics of said at least one wearer, and behavior of said at least one wearer. In some embodiments, at least part of the characteristics of the at least one wearer is induced by the ophthalmic lens. In some embodiments, the behavior of the at least one wearer may include proportions of time spent in near and far vision. In some embodiments, the optical characteristics of the ophthalmic lens may include optical power of the ophthalmic lens in at least one location of the ophthalmic lens. In some embodiments, the at least one location of the ophthalmic lens may include at least one of a near vision point or a far vision point of the ophthalmic lens. In some embodiments, the characteristics of the at least one wearer may include at least one of central refraction, one or more peripheral refractions, or accommodative lag. In some embodiments, the one or more peripheral refractions may be related to eye shape; and the accommodative lag may be related to a psychologic profile of the at least one wearer.

At 704, the apparatus may determine, based on a predetermined relationship model, the efficacy of the ophthalmic lens for said at least one wearer from said representative data corresponding to the at least one wearer. In some embodiments, said efficacy may be configured for choosing an appropriate ophthalmic lens suited to control said at least one sightedness impairment of said at least one wearer. In such embodiments, choosing an appropriate ophthalmic lens may be lens selection and evaluation, as well as lens conception, insofar as the predictive performance factor (efficacy) directed to particular users is aimed at choosing appropriate lenses for those users.

In some embodiment, the predetermined relationship model may compare the data representative of optical characteristics of the ophthalmic lens, characteristics of said at least one wearer, and behavior of said at least one wearer, to data of a database of lenses characteristics/efficacy.

A group of standard users may have different refractions and other ocular characteristics. A standard user may have ocular characteristics that are representative of a specific group of wearers.

In some embodiment the data relative to the refraction and the ocular characteristics of users are stored in the database.

In some embodiment the data relative to the refraction and the ocular characteristics of a standard user, which may have ocular characteristics that are representative of a specific group of users, are stored in the database.

In some embodiment, the predetermined relationship model may compare the data representative of optical characteristics of the ophthalmic lens, characteristics of said at least one wearer, and behavior of said at least one wearer, to data relative to a standard user which may have ocular characteristics that are representative of a specific group of wearers.

In some embodiment, the predetermined relationship model may compare the data representative of behavior of said at least one wearer, to data of a database of users and their respective behavior.

The predictive model may choose an appropriate ophthalmic lens based on lens selection and evaluation, as well as lens conception, insofar as the predictive performance factor (efficacy), and user ocular characteristics as well as user behaviour.

In some embodiments, to determine the efficacy of the ophthalmic lens, the apparatus may calculate an optical index for the ophthalmic lens based on said optical characteristics of the ophthalmic lens, said characteristics of said at least one wearer, and said behavior of said at least one wearer, and determine the efficacy of the ophthalmic lens from said optical index based on the predetermined relationship model.

In some embodiments, the optical index may be calculated as a weighted function of values on at least one location of retina of the at least one wearer. In some embodiments, the optical index may be calculated based on one or more of: the percentage of time spent in far vision, the percentage of time spent in near vision, weights for the at least one location of the retina of the at least one wearer, refractions for the at least one location of retina of the at least one wearer, optical powers of the ophthalmic lens corresponding to the at least one location of retina, or accommodative lag induced by the ophthalmic lens at a given distance. In such embodiments, the optical index may be the defocus index described above with reference to FIGS. 1-5. In some embodiments, the optical index may be calculated using Formula (1). In some embodiments, the optical index may be calculated using a modified or simplified version of Formula (1), e.g., Formula (2) or (3). In some embodiments, the optical powers of the ophthalmic lens corresponding to the at least one location of retina may be the defocus induced by the lens in the at least one location of retina, e.g., one or more of $CD_{Far}$, $ND_{Far}$, $TD_{Far}$, $UD_{Far}$, $LD_{Far}$, $CD_{Near}$, $ND_{Near}$, $TD_{Near}$, $UD_{Near}$, $LD_{Near}$, $CD_{Far}$, $CD_{Near}$, or $PD_{Far}$.

In some embodiments, to determine the efficacy of the ophthalmic lens, the apparatus may select the ophthalmic lens for a wearer from several ophthalmic lenses based on the optical indexes calculated for the ophthalmic lenses. Each of the optical indexes may be calculated at least partially based on characteristics of the wearer and behavior of the wearer.

Figure 8:
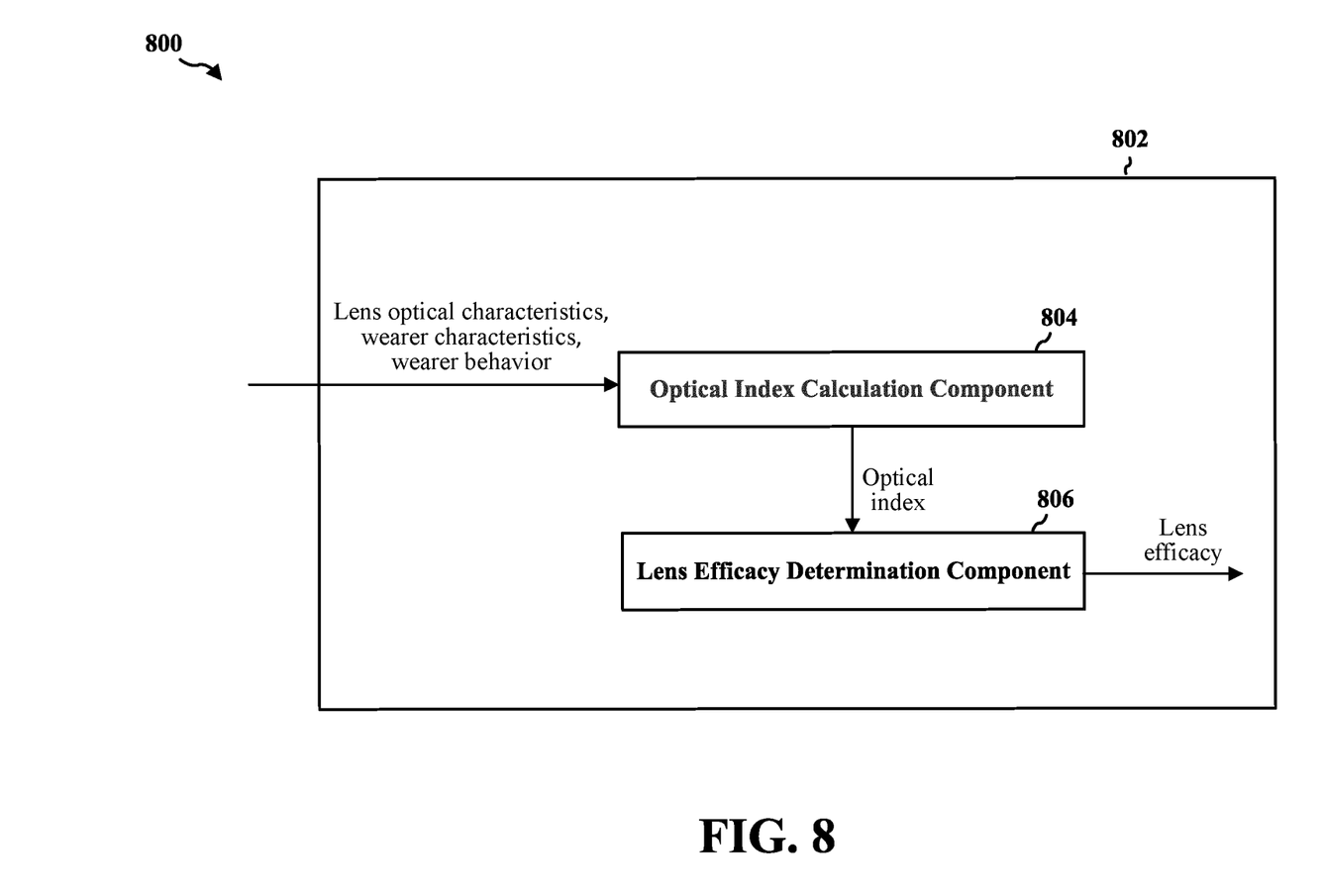
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus 802 may be a computing device or a system including multiple computing devices. The apparatus 802 may include an optical index calculation component 804 that calculates an optical index for an ophthalmic lens based on optical characteristics of the ophthalmic lens, characteristics of at least one wearer, and behavior of the at least one wearer. In one embodiment, the optical index calculation component 804 may perform the operations described above with reference to 608 in FIG. 6 or 704 in FIG. 7.

The apparatus 802 may include a lens efficacy determination component 806 that determines an efficacy of the ophthalmic lens based on the optical index received from the optical index calculation component 804. In one embodiment, the lens efficacy determination component 806 may perform the operations described above with reference to 608 in FIG. 6 or 704 in FIG. 7.

The apparatus 802 may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
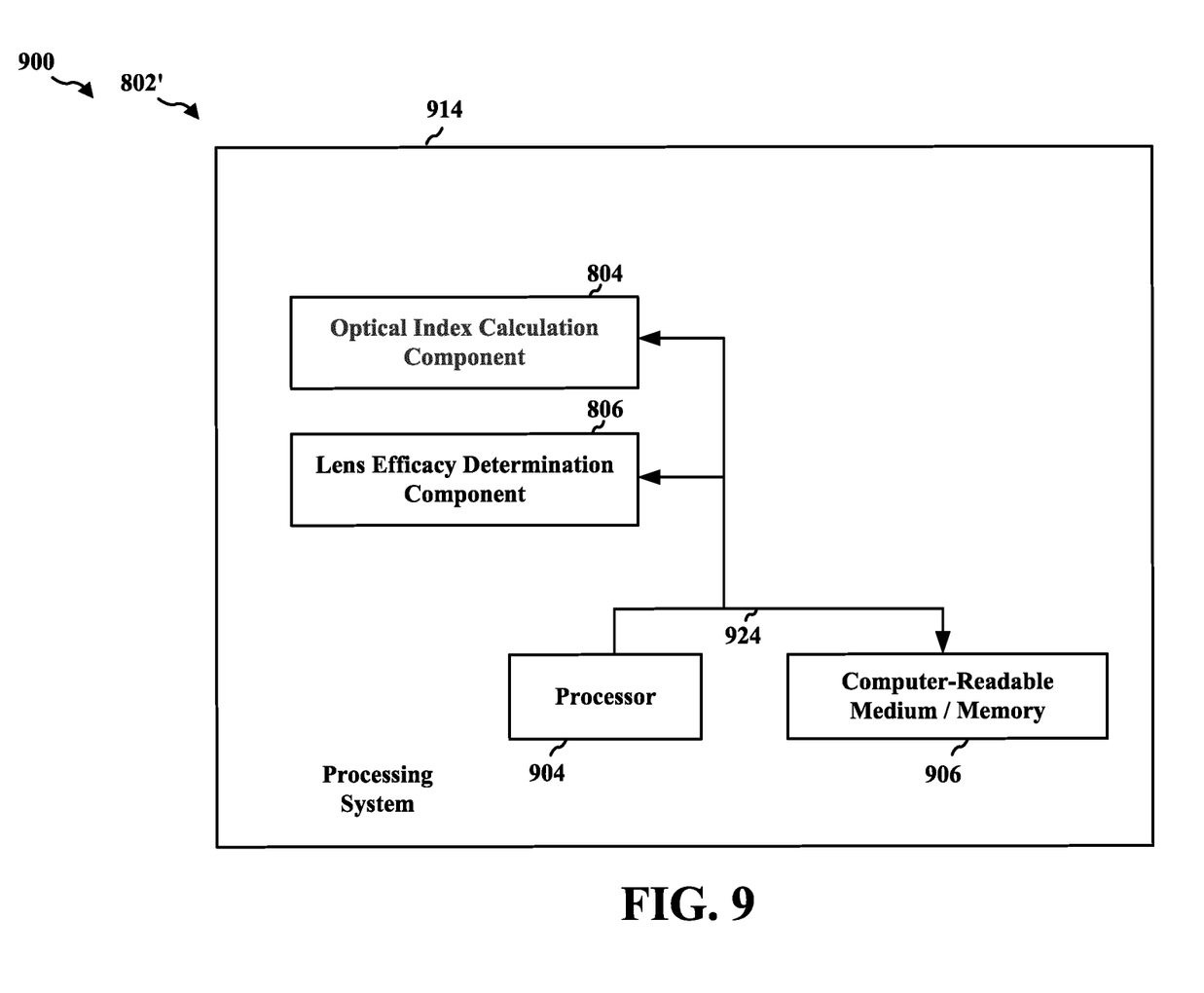
FIG. 9 is a diagram illustrating an example of a hardware implementation for an apparatus employing a processing system.

FIG. 9 is a diagram 900 illustrating an example of a hardware implementation for an apparatus 802' employing a processing system 914. In some embodiments, the apparatus 802' may be the apparatus 802 described above with reference to FIG. 8. The apparatus 802' may include one or more computing devices. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, and the computer-readable medium/memory 906. The bus 924 may also link various other circuits such as timing sources, peripherals, voltage regulators, and power management circuits, which are well known in the art, and therefore, will not be described any further.

The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes the components 804 and 806. The components may be software components running in the processor 904, resident/stored in the computer readable medium/memory 906, one or more hardware components coupled to the processor 904, or some combination thereof.

In the following, various aspects of this disclosure will be illustrated:

Example 1 is a method or computer program or apparatus for evaluating the efficacy of an ophthalmic lens in controlling at least one sightedness impairment of at least one wearer of said ophthalmic lens. The apparatus may obtain data representative of optical characteristics of the ophthalmic lens, characteristics of said at least one wearer, and behavior of said at least one wearer, and determine, based on a predetermined relationship model, the efficacy of the ophthalmic lens for said at least one wearer from said representative data corresponding to said at least one wearer. In some embodiments, said efficacy may be configured for choosing an appropriate ophthalmic lens suited to control said at least one sightedness impairment of said at least one wearer.

In Example 2, the subject matter of Example 1 may optionally include that at least part of the characteristics of the at least one wearer is induced by the ophthalmic lens.

In Example 3, the subject matter of Example 1 or Example 2 may optionally include that the behavior of the at least one wearer may include the proportions of time spent in near and far vision.

In Example 4, the subject matter of any one of Examples 1 to 3 may optionally include that the optical characteristics of the ophthalmic lens may include optical power of the ophthalmic lens in at least one location of the ophthalmic lens.

In Example 5, the subject matter of Example 4 may optionally include that the at least one location of the ophthalmic lens may include at least one of a near vision point or a far vision point of the ophthalmic lens.

In Example 6, the subject matter of any one of Examples 1 to 5 may optionally include that the characteristics of the at least one wearer may include at least one of central refraction, one or more peripheral refractions, or accommodative lag.

In Example 7, the subject matter of Example 6 may optionally include that the one or more peripheral refractions may be related to eye shape, and the accommodative lag may be related to a psychologic profile of the at least one wearer.

In Example 8, the subject matter of any one of Examples 1 to 7 may optionally include that, to determine the efficacy of the ophthalmic lens, the apparatus may: calculate an optical index for the ophthalmic lens based on said optical characteristics of the ophthalmic lens, said characteristics of said at least one wearer, and said behavior of said at least one wearer; and determine the efficacy of the ophthalmic lens from said optical index based on the predetermined relationship model.

In Example 9, the subject matter of Example 8 may optionally include that the optical index may be calculated as a weighted function of values on at least one location of retina of the at least one wearer.

In Example 10, the subject matter of Example 9 may optionally include that the optical index may be calculated based on one or more of: a percentage of time spent in far vision, a percentage of time spent in near vision, weights for the at least one location of the retina of the at least one wearer, refractions for the at least one location of retina of the at least one wearer, optical powers of the ophthalmic lens corresponding to the at least one location of retina, or accommodative lag induced by the ophthalmic lens at a given distance. In some embodiments, the optical index may be the defocus index described above with reference to FIGS. 1-5. In some embodiments, the optical index may be calculated using Formula (1). In some embodiments, the optical index may be calculated using a modified or simplified version of Formula (1), e.g., Formula (2) or (3). In some embodiments, the optical powers of the ophthalmic lens corresponding to the at least one location of retina may be the defocus induced by the lens in the at least one location of retina, e.g., one or more of $CD_{Far}$, $ND_{Far}$, $TD_{Far}$, $UD_{Far}$, $LD_{Far}$, $CD_{Near}$, $ND_{Near}$, $TD_{Near}$, $UD_{Near}$, $LD_{Near}$, $CD_{Far}$, $CD_{Near}$, or $PD_{Far}$.

In Example 11, the subject matter of any one of Examples 8 to 10 may optionally include that, to determine the efficacy of the ophthalmic lens, the apparatus may select the ophthalmic lens for a wearer from a plurality of ophthalmic lenses based on a plurality of optical indexes calculated for the plurality of ophthalmic lenses, where each of the plurality of optical indexes may be calculated at least partially based on characteristics of the wearer and behavior of the wearer.

Example 12 is a method or apparatus for constructing a relationship model configured for providing the efficacy of at least one ophthalmic lens in controlling at least one sightedness impairment of wearers of said at least one ophthalmic lens. The apparatus may: obtain data representative of optical characteristics of said at least one ophthalmic lens, characteristics of monitored wearers, and behavior of the monitored wearers; obtain monitored efficacies corresponding to said representative data; and construct the relationship model by correlating said representative data corresponding to said monitored wearers with the monitored efficacies.

In Example 13, the subject matter of Example 12 may optionally include that at least part of the characteristics of the monitored wearers may be induced by the at least one ophthalmic lens.

In Example 14, the subject matter of Example 12 or Example 13 may optionally include that the behavior of the monitored wearers may include proportions of time spent in near and far vision.

In Example 15, the subject matter of any one of Examples 12 to 14 may optionally include that the optical characteristics of the at least one ophthalmic lens may include optical power of the at least one ophthalmic lens in at least one location of the at least one ophthalmic lens.

In Example 16, the subject matter of Example 15 may optionally include that the at least one location of the at least one ophthalmic lens may include at least one of a near vision point or a far vision point of the at least one ophthalmic lens.

In Example 17, the subject matter of any one of Examples 12 to 16 may optionally include that the characteristics of the monitored wearers may include at least one of central refraction, one or more peripheral refractions, or accommodative lag.

In Example 18, the subject matter of Example 17 may optionally include that the one or more peripheral refractions may be related to eye shape, and the accommodative lag may be related to a psychologic profile of the monitored wearers.

In Example 19, the subject matter of any one of Examples 12 to 18 may optionally include that, to construct the relationship model, the apparatus may: calculate an optical index for each ophthalmic lens of the at least one ophthalmic lens based on said optical characteristics of the ophthalmic lens, said characteristics of said monitored wearers, and said behavior of said monitored wearers; and correlate the optical indexes with the monitored efficacies.

In Example 20, the subject matter of Example 19 may optionally include that the optical index may be calculated as a weighted function of values on at least one location of retina of the monitored wearers.

In Example 21, the subject matter of Example 20 may optionally include that the optical index may be calculated based on one or more of: a percentage of time spent in far vision, a percentage of time spent in near vision, weights for the at least one location of the retina of the monitored wearers, refractions for the at least one location of retina of the monitored wearers, optical powers of the ophthalmic lens corresponding to the at least one location of retina, or accommodative lag induced by the ophthalmic lens at a given distance.

In Example 22, the subject matter of any one of Examples 12 to 21 may optionally include that the representative data and the monitored efficacies may be derived from clinical data regarding the at least one ophthalmic lens.

In Example 23, the subject matter of any one of Examples 12 to 22 may optionally include that the characteristics of the monitored wearers and the behavior of the monitored wearers may be continuously updated based on clinical trials.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of evaluating an efficacy of an ophthalmic lens in controlling at least one sightedness impairment of at least one wearer of said ophthalmic lens, the method comprising:
    obtaining data representative of optical characteristics of the ophthalmic lens, characteristics of said at least one wearer, and behavior of said at least one wearer; and
    determining, by at least one processor based on a predetermined relationship model, the efficacy of the ophthalmic lens for said at least one wearer from said representative data corresponding to said at least one wearer, the predetermined relationship model comparing the data representative of optical characteristics of the ophthalmic lens, characteristics of said at least one wearer, and behavior of said at least one wearer, to data of a database of characteristics/efficacy of a plurality of lenses, the predetermined relationship model comprising correlating or linking, through a mathematical function, a criterion and a performance factor for each lens of the database.

2. The method of claim 1, wherein at least part of the characteristics of the at least one wearer is induced by the ophthalmic lens.

3. The method of claim 2, wherein the behavior of the at least one wearer comprises proportions of time spent in near and far vision.

4. The method of claim 2, wherein the optical characteristics of the ophthalmic lens comprise optical power of the ophthalmic lens in at least one location of the ophthalmic lens.

5. The method of claim 2, wherein the characteristics of the at least one wearer comprise at least one of central refraction, one or more peripheral refractions, or accommodative lag.

6. The method of claim 1, wherein the behavior of the at least one wearer comprises proportions of time spent in near and far vision.

7. The method of claim 6, wherein the optical characteristics of the ophthalmic lens comprise optical power of the ophthalmic lens in at least one location of the ophthalmic lens.

8. The method of claim 6, wherein the characteristics of the at least one wearer comprise at least one of central refraction, one or more peripheral refractions, or accommodative lag.

9. The method of claim 1, wherein the optical characteristics of the ophthalmic lens comprise optical power of the ophthalmic lens in at least one location of the ophthalmic lens.

10. The method of claim 9, wherein the at least one location of the ophthalmic lens comprises at least one of a near vision point or a far vision point of the ophthalmic lens.

11. The method of claim 1, wherein the characteristics of the at least one wearer comprise at least one of central refraction, one or more peripheral refractions, or accommodative lag.

12. The method of claims 11, wherein the one or more peripheral refractions are related to eye shape, and the accommodative lag is related to a psychologic profile of the at least one wearer.

13. The method of claim 1, wherein the determining of the efficacy of the ophthalmic lens comprises:

calculating an optical index for the ophthalmic lens based on said optical characteristics of the ophthalmic lens, said characteristics of said at least one wearer, and said behavior of said at least one wearer; and determining the efficacy of the ophthalmic lens from said optical index based on the predetermined relationship model.

14. The method of claim 13, wherein the optical index is calculated as a weighted function of values on at least one location of retina of the at least one wearer.

15. The method of claim 14, wherein the optical index is calculated based on one or more of: a percentage of time spent in far vision, a percentage of time spent in near vision, weights for the at least one location of the retina of the at least one wearer, refractions for the at least one location of retina of the at least one wearer, optical powers of the ophthalmic lens corresponding to the at least one location of retina, or accommodative lag induced by the ophthalmic lens at a given distance.

16. The method of claim 13, wherein the determining of the efficacy of the ophthalmic lens comprises selecting the ophthalmic lens for a wearer from a plurality of ophthalmic lenses based on a plurality of optical indexes calculated for the plurality of ophthalmic lenses, wherein each of the plurality of optical indexes is calculated at least partially based on characteristics of the wearer and behavior of the wearer.

17. An apparatus for evaluating an efficacy of an ophthalmic lens in controlling at least one sightedness impairment of at least one wearer of said ophthalmic lens, the apparatus comprising:

a memory; and at least one processor coupled to the memory and configured to:

obtain data representative of optical characteristics of the ophthalmic lens, characteristics of said at least one wearer, and behavior of said at least one wearer, and determine, based on a predetermined relationship model, the efficacy of the ophthalmic lens for said at least one wearer from said representative data corresponding to said at least one wearer, the predetermined relationship model comparing the data representative of optical characteristics of the ophthalmic lens, characteristics of said at least one wearer, and behavior of said at least one wearer, to data of a database of characteristics/efficacy of a plurality of lenses, the predetermined relationship model comprising correlating or linking, through a mathematical function, a criterion and a performance factor for each lens of the database.

18. The apparatus of claim 17, wherein the behavior of the at least one wearer comprises proportions of time spent in near and far vision.

19. The apparatus of claim 17, wherein the optical characteristics of the ophthalmic lens comprise optical power of the ophthalmic lens in at least one location of the ophthalmic lens.

20. A non-transitory computer-readable medium on which is stored a computer program that, when executed by a computer, evaluates an efficacy of an ophthalmic lens in controlling at least one sightedness impairment of at least one wearer of said ophthalmic lens, the computer program comprising instructions to perform steps of:

obtaining data representative of optical characteristics of the ophthalmic lens, characteristics of said at least one wearer, and behavior of said at least one wearer; and determining, based on a predetermined relationship model, the efficacy of the ophthalmic lens for said at least one wearer from said representative data corresponding to said at least one wearer, the predetermined relationship model comparing the data representative of optical characteristics of the ophthalmic lens, characteristics of said at least one wearer, and behavior of said at least one wearer, to data of a database of characteristics/efficacy of a plurality of lenses, the predetermined relationship model comprising correlating or linking, through a mathematical function, a criterion and a performance factor for each lens of the database.

* * * * *